(12) United States Patent
Anderer et al.

(10) Patent No.: US 10,830,739 B2
(45) Date of Patent: Nov. 10, 2020

(54) TEMPORARY STORAGE OF SAMPLE PORTIONS FOR ARTEFACT-PREVENTING FLUID PROCESSING

(71) Applicant: Agilent Technologies, Inc., Santa Clara, CA (US)

(72) Inventors: Herbert Anderer; Konstantin Shoykhet, Karlsruhe (DE); Klaus Witt, Keltern (DE); Stephan Buckenmaier, Ettlingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 149 days.

(21) Appl. No.: 15/500,706

(22) PCT Filed: May 28, 2015

(86) PCT No.: PCT/IB2015/054003
§ 371 (c)(1),
(2) Date: Jan. 31, 2017

(87) PCT Pub. No.: WO2016/016740
PCT Pub. Date: Feb. 4, 2016

(65) Prior Publication Data
US 2017/0219540 A1 Aug. 3, 2017

(30) Foreign Application Priority Data

Jul. 31, 2014 (DE) .................. 10 2014 110 865

(51) Int. Cl.
*G01N 30/46* (2006.01)
*G01N 30/82* (2006.01)
(Continued)

(52) U.S. Cl.
CPC ....... *G01N 30/463* (2013.01); *B01D 15/1878* (2013.01); *B01D 15/242* (2013.01);
(Continued)

(58) Field of Classification Search
CPC .................. G01N 30/34; G01N 30/24; G01N 2030/342–347; G01N 2030/201–202;
(Continued)

(56) References Cited

U.S. PATENT DOCUMENTS 3,744,219 A   7/1973 Tindle et al.
4,158,630 A   6/1979 Stearns
(Continued)

FOREIGN PATENT DOCUMENTS

CN         2443376         8/2001
CN       102253159 A      11/2011
(Continued)

OTHER PUBLICATIONS

Cappiello et al, Variable-Gradient Generator for Micro- and Nano-HPLC, Analytical Chemistry, vol. 75, No. 5, Mar. 1, 2003, pp. 1173-1179.*
(Continued)

*Primary Examiner* — David L Singer

(57) ABSTRACT

In a method for processing successive fluidic sample portions provided by a sample source, sample reception volumes are filled successively temporarily with at least a respective one of the sample sections, and the sample sections are emptied successively out of the sample reception volumes in such a way, that, while emptying, it is avoided to bring two respective ones of the sample sections, which have not left the sample source directly adjacent to one another, in contact with one another.

17 Claims, 7 Drawing Sheets

(51) Int. Cl.
*G01N 30/22* (2006.01)
*G01N 30/24* (2006.01)
*B01D 15/18* (2006.01)
*B01D 15/24* (2006.01)
*G01N 30/44* (2006.01)
*G01N 30/20* (2006.01)
*G01N 30/84* (2006.01)
*G01N 30/02* (2006.01)

(52) U.S. Cl.
CPC ............ *G01N 30/22* (2013.01); *G01N 30/24* (2013.01); *G01N 30/44* (2013.01); *G01N 30/465* (2013.01); *G01N 30/82* (2013.01); *G01N 2030/027* (2013.01); *G01N 2030/202* (2013.01); *G01N 2030/208* (2013.01); *G01N 2030/445* (2013.01); *G01N 2030/8411* (2013.01)

(58) Field of Classification Search
CPC ........ G01N 2030/207–208; G01N 2030/8411; G01N 2030/8417; G01N 35/1097; B01D 15/1878; B01D 15/242
USPC .............................................. 73/61.55–61.56
See application file for complete search history.

(56) References Cited

U.S. PATENT DOCUMENTS

| | | | |
|---|---|---|---|
| 5,117,109 A | 5/1992 | Asakawa et al. | |
| 6,299,767 B1* | 10/2001 | Dourdeville | B01D 15/166 210/101 |
| 6,537,432 B1* | 3/2003 | Schneider | G01N 27/44726 204/450 |
| 8,186,381 B2* | 5/2012 | Wilen | F16K 11/074 137/580 |
| 2006/0156792 A1* | 7/2006 | Wang | G01N 30/463 73/23.37 |
| 2007/0134808 A1 | 6/2007 | Sullivan | |
| 2008/0160629 A1* | 7/2008 | Balgley | B01D 15/1878 436/161 |
| 2008/0229810 A1* | 9/2008 | Swart | G01N 30/20 73/61.55 |
| 2009/0050212 A1* | 2/2009 | Dourdeville | G01N 30/20 137/14 |
| 2011/0049031 A1* | 3/2011 | Cappiello | G01N 30/32 210/198.2 |
| 2012/0240666 A1 | 9/2012 | Sims | |
| 2013/0008859 A1* | 1/2013 | Witt | G01N 30/463 210/767 |
| 2013/0056084 A1* | 3/2013 | Dourdeville | G01N 30/20 137/14 |
| 2013/0134095 A1 | 5/2013 | Anderer et al. | |
| 2016/0195466 A1* | 7/2016 | Loboda | G01N 15/1056 506/9 |

FOREIGN PATENT DOCUMENTS

| | | |
|---|---|---|
| CN | 102866216 A | 1/2013 |
| CN | 203178243 U | 9/2013 |
| CN | 103930778 A | 7/2014 |
| EP | 0309596 A1 | 4/1989 |
| WO | 2014000778 A1 | 1/2014 |
| WO | WO-2014127269 A1 * | 8/2014 ......... G01N 35/0092 |

OTHER PUBLICATIONS

McMaster, HPLC: A Practical User's Guide, Second Edition, Appendix D Glossary of HPLC Terms (Year: 2007).*
Stankovich, Doctoral Dissertation Increasing the Throughput of Liquid Chromatography, University of Tennessee (Year: 2014).*
Agilent Technologies, Agilent ChemStation Understanding Your ChemStation, Jul. 2009 (Year: 2009).*
National Instruments, LabVIEW User Manual, Apr. 2003 Edition (Year: 2003).*
Groskreutz, Stephan R. et al.; "Selective comprehensive multi-dimensional seapartion for resolution enhancement in high performance liquid chromatography. Part I: Principles and instrumentation", Journal of Chromatography; vol. 1228, pp. 31-40, (2012).
International Search Report dated Sep. 8, 2015 from related International Application No. PCT/IB2015/054003.
Larson Elliot D. et al.; "Development of selective comprehensive two-dimensional liquid chromatography with parallel first-dimension sampling and second-dimension separation-application to the quantitative analysis of furanocoumarins in apiaceous vegetables", Analytical and Bioanalytical Chemistry; vol. 405, No. 13; pp. 4639-4653, (2013).
Zhang Kelly et al.; "Analysis of pharmaceutical impurities using multi-heartcutting 2D LC coupled with UV-charged aerosol MS detection", Journal of Separation Science; vol. 36, pp. 2986-2992, (2013).
Statement Mentioned in Article 19(1) in related International Application No. PCT/IB2015/054003 with English Translation.

* cited by examiner

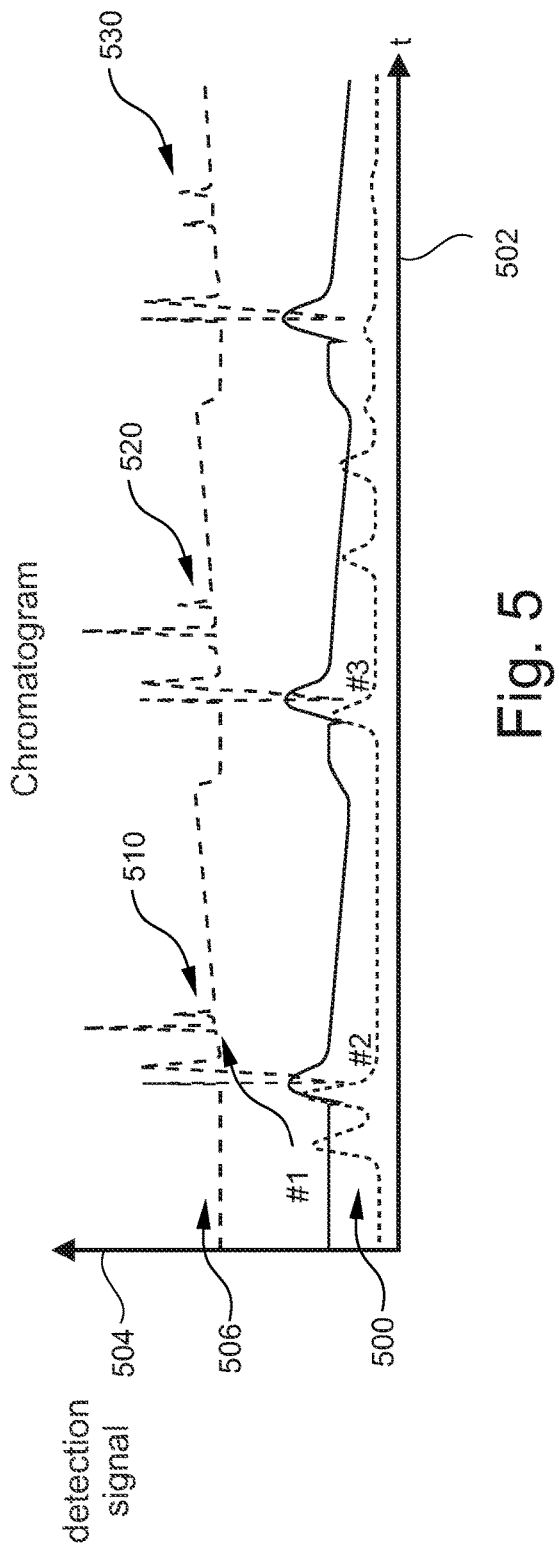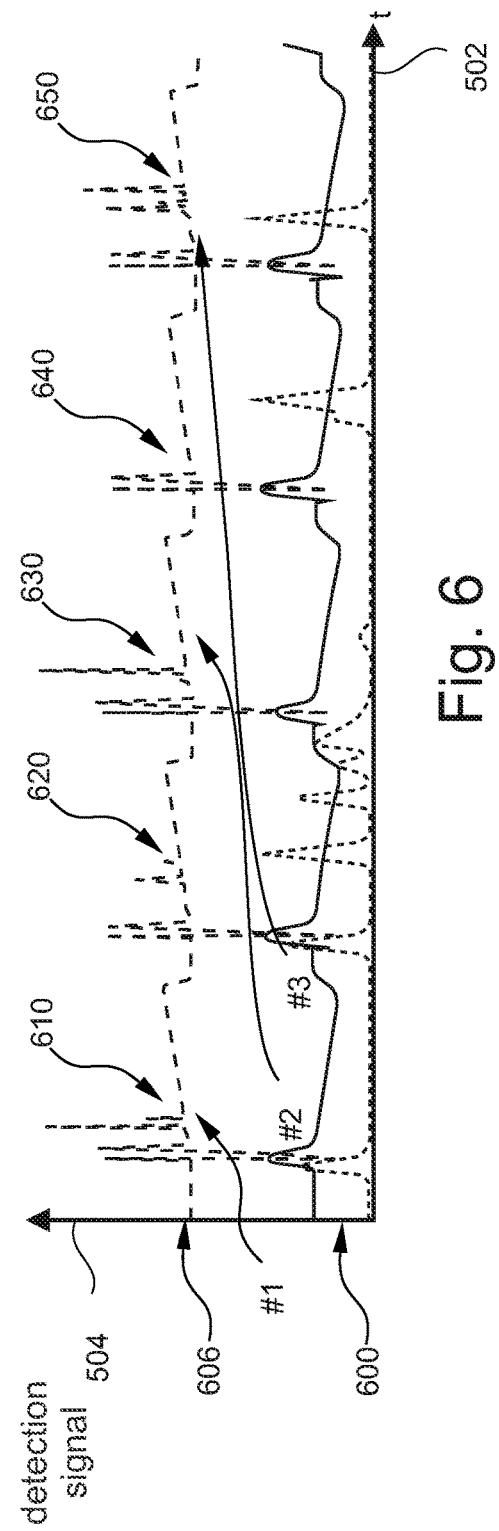

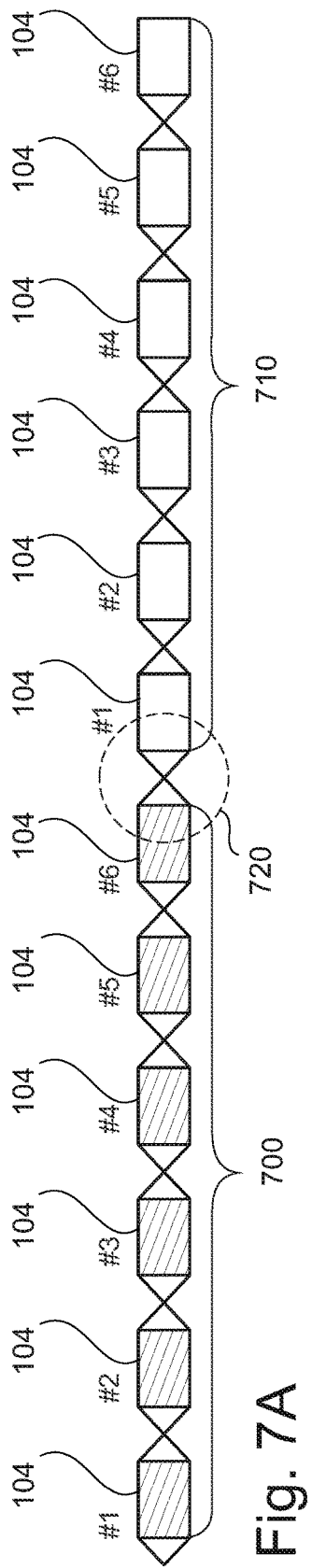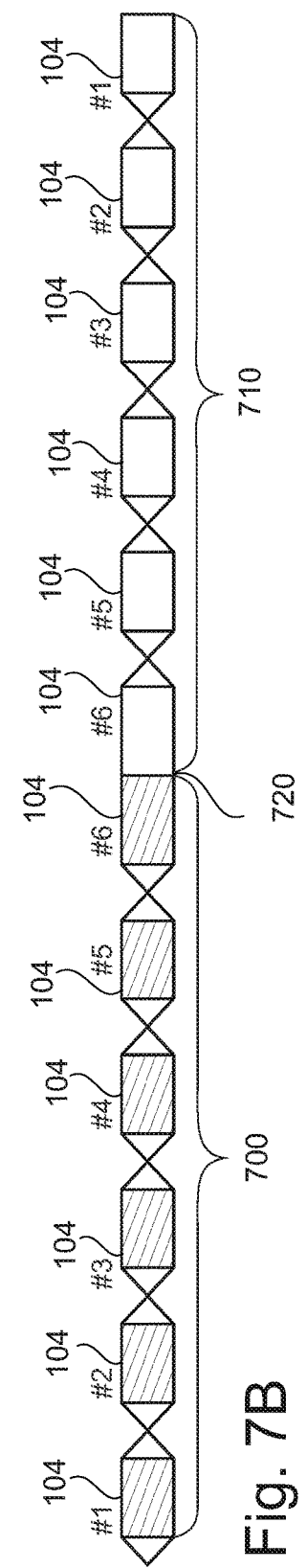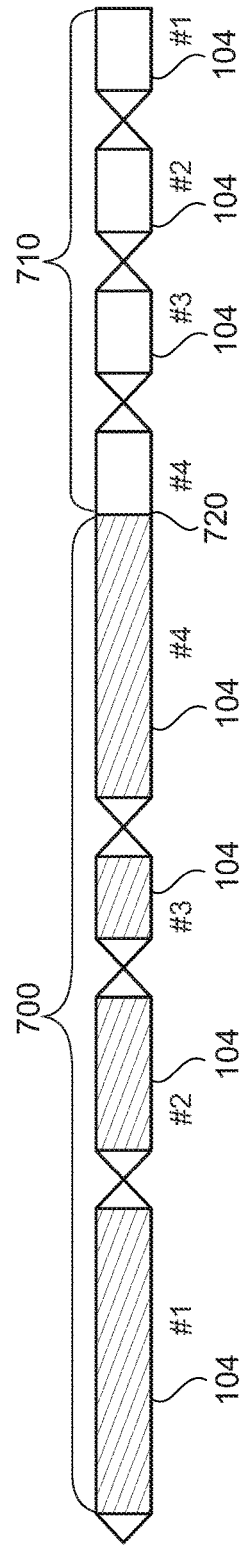

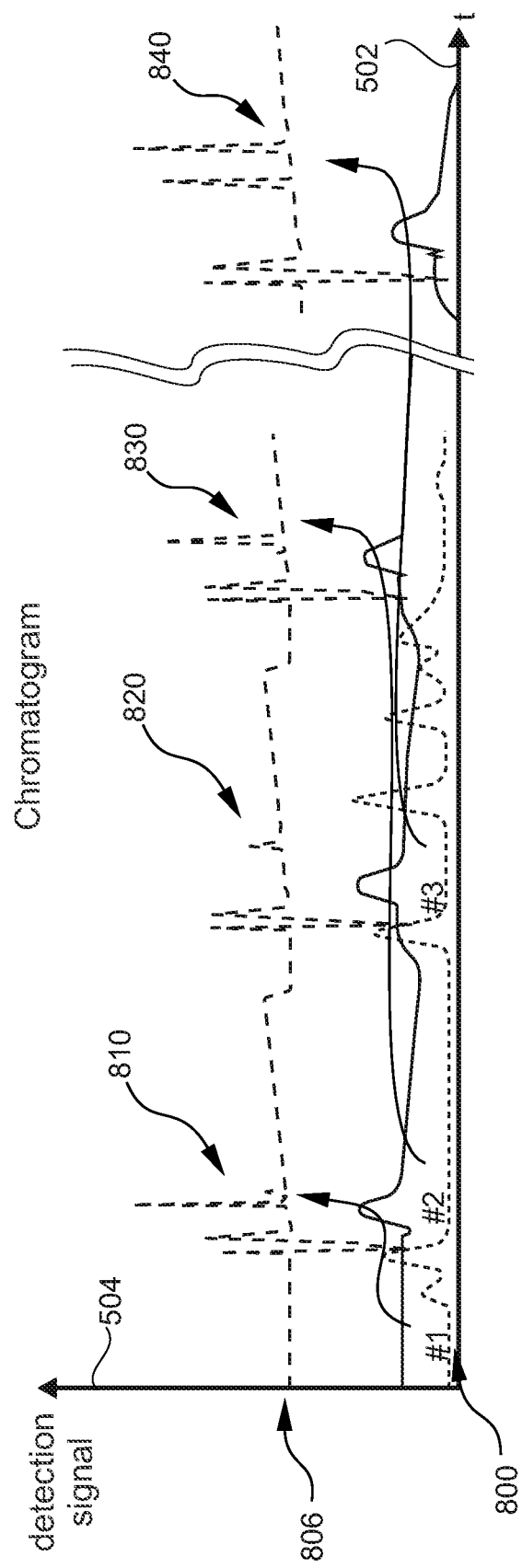

TEMPORARY STORAGE OF SAMPLE PORTIONS FOR ARTEFACT-PREVENTING FLUID PROCESSING

RELATED APPLICATIONS

This application is the national stage under 35 U.S.C. 371 of International Application No. PCT/M2015/054003, filed May 28, 2015, titled "TEMPORARY STORAGE OF SAMPLE PORTIONS FOR ARTEFACT-PREVENTING FLUID PROCESSING"; which claims priority to German Patent Application No. DE 10 2014 110 865.5, filed Jul. 31, 2014; the entire contents of each of which are incorporated herein by reference.

TECHNICAL BACKGROUND

The present invention relates to methods and fluid processing apparatuses for processing successive fluidic sample sections provided by a sample source as well as a system for processing a fluidic sample.

In a HPLC (High Performance Liquid Chromatography), typically, a fluid (mobile phase) is moved through an adsorption medium, a so-called stationary phase (for example in a chromatographic column), at a very precisely controlled flowrate (for example in the range of microliters to milliliters per minute) and at a high pressure (typically 20 to 1000 bars and in excess thereof, presently up to 2000 bars), at which the compressibility of the fluid can be perceptible, in order to separate individual components of a sample fluid, which has been introduced into the mobile phase, from one another. Such a HPLC system is known, for example, from EP 0,309,596 B1 of the same applicant, Agilent Technologies, Inc.

In a one-dimensional chromatography, it is possible to occur that of the substances to be separated, two or more different ones move forward equally or approximately equally rapidly, and thus can be found at the same or at approximately the same position in a chromatogram. For their further separation, two-dimensional chromatography can be applied, wherein, in a second operation possibly different separation conditions, such as another stationary phase and/or another mobile phase, are used for a recurring chromatography of fractions out of the first separation, such that the substances, which can hardly be differentiated after the first operation, can now also be separated from one another.

In the two-dimensional liquid chromatography, a run can be started in a second dimension (corresponding to a second separation stage), after a fraction has been detected, or its early stage has been recognized, in the first dimension (corresponding to a first separation stage), in a sample section of the fluidic sample, which is to be separated. If another fraction is detected in the first separation stage in another sample section of the fluidic sample to be separated, while a preceding fraction is still being analyzed in the second separation stage, this further fraction can be stored temporarily (buffered). A conventional approach consists in a temporarily storing of the volume of the fraction (that is, of the corresponding sample separation section) in one of a plurality of fluid containers, such as for example capillaries between fluid ports of a fluidic valve, wherein the sample volume, which for example belongs to a further fraction, is lead into such a capillary for a temporarily storing by switching the fluid path to another valve position. Typically, two capillaries, which are connected with the fluidic valve, are used for the temporarily storing, in order to enable a temporarily storing uninterruptedly, i.e. without loss of the continuously conveyed sample fluid. As soon as the analysis in the second dimension has been effected, the capillary with the subsequent temporarily stored sample section (for example having a subsequent fraction) is introduced into the fluid path of the second dimension, and a new separation is started in the second dimension.

State of the art is disclosed in U.S. Pat. Nos. 3,744,219, 4,158,630, 5,117,109 and Groskreutz, S., Swenson M., Secor, L., Stoll D.: "Selective comprehensive multi-dimensional separation for resolution enhancement in high performance liquid chromatography. Part I: principles and instrumentation", J Chromatogr A, 2012, 1228:31-40.

When transferring sample sections out of the first separation stage into the second separation stage, there is the risk of an undesired sample carry-over. This can lead to artefacts in the resulting chromatogram, and thus to a deterioration of the detection accuracy.

DISCLOSURE

It is an object of the invention to handle successive sample sections provided by a sample source, such that these can subsequently be further processed in a low-artefact or even an artefact-free manner.

According to an exemplary embodiment example of the present invention, there is provided a fluid processing apparatus (which can be embodied as a stand-alone device or as a part of a larger system) for processing of (particularly directly) successive fluidic sample sections provided by a sample source, wherein the fluid processing apparatus comprises: a plurality of sample reception (or holding) volumes, which are configured to be filled successively temporarily with at least a respective one of the sample sections, and a control device (for example embodied as a processor, which can be configured in an according manner by programming measures), which is configured to empty successively the sample sections out of the sample reception volumes, such that, while emptying, it is or will be avoided (in particular made impossible) to bring two respective ones of the sample sections, which have not left the sample source directly adjacent to one another (that is, did not directly adjoin one another at the outlet of the sample source), in contact (in particular direct contact and/or contact causing a mixture) with one another.

According to another exemplary embodiment example of the present invention, there is provided a method for processing successive fluidic sample sections provided by a sample source, wherein in the method: sample reception volumes are filled successively temporarily with at least a respective one of the sample sections, and the sample sections are emptied successively out of the sample reception volumes, such that, while emptying, it is, or will be, avoided to bring two respective ones of the sample sections, which have not left the sample source directly adjacent to one another, in contact with one another.

According to still another exemplary embodiment example, there is provided a fluid processing apparatus (which can be embodied as a stand-alone device or as a part of a larger system) for processing (particularly directly) successive fluidic sample sections provided by a sample source, wherein the fluid processing apparatus comprises: a plurality of sample reception volumes, which are configured to be filled successively temporarily with at least a respective one of the sample sections, a control device (for example, embodied as a processor, which can be configured in an according manner by programming measures), which is configured to empty successively the sample sections out of the sample reception volumes, and an assignment device (for example, embodied as a further processor or as a part of a processor containing the control device, which processor(s) can, in both cases, be configured in an according manner by programming measures), which is configured to assign assignment information (in particular, a data set, which assigns data to at least one of, or to each of, the sample sections, which data describe the processing history prior to said filling in a respective sample reception volume and/or after said emptying out of a respective sample reception volume, in particular further in the form of one or more time-stamps) to at least one of the sample sections, wherein the assignment information is indicative for a (particularly temporal) rank of the respective sample section in a (particularly temporal) ranking order of said filling of the sample reception volumes with the sample sections and/or in a (particularly temporal) ranking order of said emptying of the sample sections out of the sample reception volumes (in particular, the assignment information can be indicative for a position of the respective sample section in an order (sequence) of said filling and/or said emptying of the sample sections, which emptying order differs from a filling order, according to which the sample reception volumes have been filled with the sample sections), wherein the control device is configured to control a further processing of the sample sections based on said assignment information (in particular, the assignment information is used to adapt (or match) the further processing on the basis thereof, further in particular to perform a back scaling of a drifting gradient to an origin of a respective, temporarily stored sample section).

According to still another exemplary embodiment example, there is provided a method for processing successive fluidic sample sections provided by a sample source, wherein in the method: sample reception volumes are filled successively temporarily with at least a respective one of the sample sections; the sample sections are emptied successively out of the sample reception volumes; assignment information is assigned to at least one of the sample sections; wherein the assignment information is indicative for a rank of the respective sample section in a ranking order of said filling of the sample reception volumes with the sample sections and/or in a ranking order of said emptying the sample sections out of the sample reception volumes; and the further processing of the sample sections is controlled on the basis of said assignment information.

According to a further exemplary embodiment example of the present invention, there is provided a system for processing a fluidic sample, wherein the system comprises: a sample source for providing successive fluidic sample sections of the fluidic sample, and at least one of the fluid processing apparatuses, having the features described above, for processing the successive fluidic sample sections provided by the sample source.

In the framework of the description, the term "fluidic sample" is understood to refer in particular to a liquid and/or gaseous sample, optionally having solid components.

In the framework of this description, the term "sample section" is understood to refer to a particularly spatially connected section of a total volume of the fluidic sample. For example, the fluidic sample (in particular the sample to be separated) can flow along a fluid line (such as for example a capillary), and thereby can be separated in a sequence of successive sample sections. The particular (or individual) sample sections are then transferred section-wise or package-wise through a fluid switch (for example realized by one or a plurality of fluid valves) into the fluid processing apparatus, such that at each point in time for example only at least one (in particular only a single one) of the sample sections is located in the fluid processing apparatus for further processing (in particular for a separation or a further separation), whereas a plurality of sample sections can be present in the sample source (for example, an upstream separation stage) and, there, can be pre-processed (particularly separated) and/or wait for the further processing in the fluid processing apparatus.

According to an exemplary embodiment example, when transferring successive sample sections from a sample source to a fluidic further processing, the sample sections can initially be stored temporarily in sample reception volumes, and the temporarily stored sample sections can subsequently be transferred individually and according to a prescribable order to said further processing. The selection of the order of said emptying the temporarily stored sample sections out of the sample reception volumes is effected preferably with an observation of the condition, that it is prevented that two sample sections, which directly follow one another in the emptying sequence, have not been directly adjacent to one another when being provided at the outlet of the sample source. Thereby, at the most a quantitative, but not a qualitative, disturbance of the further processing may result, even if undesired residual sample quantities occur in feed and/or drain lines (particularly between transfer valves and/or within such a transfer valve). This is, because the sample sections provided by the sample source (particularly, sample sections separated in a first chromatography separation stage) often have, when in spatial proximity, a close relation as concerns in regard of the contents (in particular, have similar retention times). Thus, in the case of a contamination of a sample section with fluid of a sample section, which is directly adjacent in the sample source, at the most slighter disturbances in regard of the intensity of particular (individual) sample fractions result (for example, slight quantitative disturbances of a peak height or a peak area in a chromatogram). If, by contrast, a sample section of the sample source is contaminated, in the feed lines or the drain lines, by sample residues of a sample section, which is more away at the side of the sample source, wherein these two sample sections have been far away from one another (in particular, having strongly different retention times) (in particular as a result of strongly different fluidic or chemical properties) in the sample source, then one or more additional, artificial fractions (for example, at least an additional artificial peak in a chromatogram) may result in the sample section, which is contaminated thereby. Stated differently, highly undesired qualitative artefacts may result from the described and similar effects. By the avoidance of an undesired intermixture, an undesired bringing-in-connection, or an undesired common further processing of sample sections having unrelated processing history, it can be avoided with a high probability, that substances become identifiable in the mass spectrum of a sample package, which substances are actually/causally related based on a mismeasurement. Stated differently, it can be achieved that a residual fluid, which is present in linking (or intermediate) lines, does not contain extrinsic substances, which do not originate from a presently handled sample sections and/or fluid packages, which were initially directly adjacent (preceding and/or succeeding) to one another. Thus, sample carry-over and detection artefacts can be suppressed strongly or even avoided totally. To this end, preferably, a bringing-in-contact of two sample sections, which have not left the sample source directly adjacent to one another, can be made impossible.

According to an alternative or supplemental embodiment example, at least one of, or each one of, the sample sections can be provided with assignment information (for example, a date-stamp, which is indicative for a position of the respective sample section in the filling sequence and/or in the emptying sequence), when successively filling the sample reception volumes with sample sections and the subsequent emptying of the sample reception volumes filled with the sample sections according to a presettable order (or sequence) (which, for example, can be selected for suppressing or eliminating the artefacts described before). For example, in a rearrangement of the sample sections between the filling and the emptying, it can be ensured thereby that the further processing of the sample sections (for example a secondary separation of the sample sections, which are already separated in fractions, in a second chromatography separation stage, in which the fractions are further separated in partial fractions) is performed, thereby taking into account the initial position of a respective sample section in the sequence of sample sections provided from the sample source. For example, if the sample sections are provided by the sample source after a first chromatography separation stage, and, after the temporarily storing in the sample reception volumes, the sample components in the sample sections are supplied to a second chromatography separation, particularly quasi in a reverse operation, then a rearrangement of individual measurement ranges according to the sample sections, which have been supplied in reverse order to the secondary chromatography separation has to be performed, in order to obtain a correct chromatogram. Thus, in order to be able to meaningfully evaluate measurement data and/or back-calculate a true mass spectrum, an additional date-stamp can be stamped on the progressing measurement data as the assignment information, wherein the date-stamp indicates, which temporarily storing history a temporarily buffered (stored) sample section has and/or at which position this sample section has been located when leaving the sample source and upon the emptying. For the example of a liquid chromatography measurement in a first dimension and a second dimension, this date-stamp and/or the assignment information may contain the affiliation (or belonging) of peaks in a second dimension to a particular sample section (and peaks corresponding therewith) in the first dimension, in summary thus, particularly the coordinates in an (at least) two-dimensional field. The origin of the handling of the sample sections is the filling order, which may, however, have been lost by temporarily storing, buffering or parking. This circumstance is to emanate from the data and/or the assignment information in a restorable manner. The assignment information may contain a position of a sample section at the source as a meaningful information, whereas the ranking order of the emptying may be recognized from the progressing data stream. Conversely however, the assignment information, which indicates, at which position in the order of the emptying the respective sample section shall stand later, can already be stamped on each sample section in the order of the sample source.

Additional implementations of the fluid processing apparatuses, of the system and of the methods are described in the following.

According to an embodiment example, the avoidance described above of the bringing-in-contact of sample sections, which are not directly adjacent to one another at the side of the sample source, is dispensable for those potentially sample-free fluid sections, which contain only a mobile phase. In other words, it is not necessary to keep section-wise separated a formerly sufficiently clean and desired fluidic contents of a loop, as described. An exception is queasily/virtually represented by a pre-fill of the loops, which have not been directly adjacent at the side of the sample source, but which does not disturb here, however, because it counts to the mobile phase.

In the sample source, a fluidic sample can be separated in sample sections, of which no one, one or multiple ones may contain fractions. In the framework of this description, the term "fractions" is understood such that the fluidic sample is separated in individual groups of substances, wherein each particular and associated (belonging together) group of substances can be referred to as a fraction. The subdivision of the fluidic samples in the fractions can be effected in a (particularly first) separation stage based on a (particularly first) separation criterion. For example, sample substances of a common fraction can be similar or identical in respect of a physical and/or chemical property. Such a property may be the mass, the volume, a mass-to-charge ratio, an electric charge, the affinity to a stationary phase (column packing material, separation medium, etc.) etc.

In the fluid processing apparatus, fractions of the fluidic sample, which are contained in the sample sections, can be separated, respectively in one or a plurality of partial fractions. In the framework of this description, the term "partial fractions" is understood to refer in particular to sub-groups of sample substances of a common fraction. In other words, the fluidic sample can initially, in a first separation stage, be divided in the fractions, and then, in a second separation stage, at least a portion of the fractions can be divided in a plurality of partial fractions. The separation (division) of a respective fraction in partial fractions may be effected in the second separation stage on the basis of a second separation criterion, which may, for example, be different from the first separation criterion. For example, sample substances of a common partial fraction may be similar or even identical in respect of a physical and/or chemical property. Such a property may be the mass, the volume, a mass-to-charge ratio, an electric charge, the affinity to a stationary phase (for example, column packing material, separation medium, etc.) etc.

Furthermore, it is to be noted that the application case of two-dimensional liquid chromatography, wherein a first chromatography separation occurs in the sample source and a second chromatography separation occurs after said temporarily storing the sample sections in the sample reception volumes, is not the only embodiment example of the invention. Another exemplary embodiment example relates to a process observation, wherein the sample sections from the sample source are to be conveyed to an arbitrary sample destination, and wherein, for example, due to different processing speeds of fluidic samples in the sample source on the one side and in the sample destination on the other side, a temporarily storing of the sample sections in the sample reception volumes is to be conducted.

According to an embodiment example, said successive emptying of the sample sections out of the sample reception volumes can be effected such that it is avoided for components of a sample section, which, prior to the filling, is not adjacent to a sample section that has just been emptied, to remain in feed lines, and to impurify, to contaminate or to lead to a sample carry-over to the sample section that has just been emptied. Even if historical sample material might remain, in a small quantity, in feed lines (for example, capillaries, valve notches, etc.) in an undesired, but not always completely avoidable manner, then at least a particularly undesired occurrence of artificial additional peaks in a measurement spectrum (for example, a chromatogram)

can be avoided when making impossible an intermixing of sample sections, which initially were not directly adjacent in the sample source. Such artificial additional peaks in the fluid processing apparatus are the more probable, the less the histories of sample sections, which undesirably come in interaction, in the sample source are interrelated with one another, that is, the more distant the sample sections, which later mix partially, are/have been away from one another in the sample source (in particular as the result of a first chromatography separation).

According to an embodiment example, an order of said filling of the sample reception volumes with the sample sections and an order of said emptying of the sample sections out of the sample reception volumes can be matched and/or adjusted to each other, such that at the transition between the filling and the emptying, the sample reception volume, which was filled last, is emptied first. Thereby, a step and/or an unsteadiness in the handling of sample sections is avoided at the interface between the filling and the emptying. At such a step, the emptying would start with a sample section, which has not been filled at last in the sample reception volume for temporary storage. When the filling ends, the feed lines are probably still filled with a fluid, which belongs to the sample section that has been filled in lastly. Then, when the first emptying starts with the same fluid, that is, the sample section, which has been filled in lastly, is emptied first, an undesired sample carry-over between sample sections, which do not have a close spatial relationship, is avoided at the interface between the filling and the emptying. The relevant feed lines are an ingoing and an outgoing line. With the described measure, care can be taken that only the ingoing feed line now contains only adjacent sample sections. In the case that the outgoing line still contains medium, which is undesired in respect of an interaction with a sample section just handled, then the sample reception volume, which has been filled lastly, can be emptied and the result can be discarded deliberately. A matrix, which is initially located in the loop, is thus no problem, even if it is in the back line later.

According to an embodiment example, said emptying of the sample sections out of the sample reception volumes can be effected in a reverse order in respect of an order of said filling of the sample reception volumes with the sample sections. This can be considered as an active process, which effects the avoidance of the above described bringing-in contact of the mentioned sample sections. This filling and emptying logic can be referred to as a LIFO logic ("last in, first out"), according to which the sample section that has been filled in a sample reception volume at last, is at first emptied and supplied to the further processing, then the sample section, which has been temporarily stored next to lastly, etc. The sample section, which has been filled in a sample reception volume as the second one, is emptied as the next to last, and the sample section, which has been filled in the sample reception volume as the first one, is emptied at the very end. According to an exemplary embodiment example, such a LIFO principle is performed in a pure form. According to another exemplary embodiment example, a LIFO logic with modifications is also possible. For example, if a set of sample reception volumes to be emptied is partially emptied and is then filled completely, all the sample reception volumes, which are filled then, are emptied according to a LIFO logic.

According to an embodiment example, the filling and the emptying of the sample reception volumes may be performed by switching a fluid valve or multiple (for example cooperating or synchronized) fluid valves. Such a fluid valve may comprise a first valve body and a second valve body, which can be moved relative to one another (particularly shifted longitudinally to one another or preferably rotated relatively to one another) for establishing different fluid coupling states. For example, the first valve body (for example a stator) may comprise a plurality of ports as the fluid terminals for fluidically coupling to fluidic assemblies. The second valve body (for example a rotor) may comprise a plurality of fluid lines (for example notches), which may be brought in fluid communication with different ones of the ports by the relative movement between the two valve bodies, in order to be able to adjust a respective fluid coupling state. A control device (for example a processor) may impress onto the at least one fluid valve a defined switching logic, with which the filling and the emptying of the sample reception volumes, which are fluidically coupled with the at least one fluid valve, can be adjusted in a desired manner, in order to avoid a sample carry-over. Slight valves, alternatively or in addition also fluid valves of a different construction type, may be used as fluid valves.

According to an embodiment example, at least one of the sample reception volumes may be configured as a respective fluid line section (for example capillary section) between two respective ports of the fluid valve. For example, two respective ones of the ports may be fluidically coupled with one another by a capillary section or by a so-called sample loop as the fluid line section, wherein the interior volume of the fluid line section may form the associated sample reception volume. By providing a sufficiently large number of ports, one single fluid valve may serve an arbitrary plurality of sample reception volumes, and temporarily store and/or demonstratively park them by switching the fluid valve between the sample source and a fluid further processing path. This fosters a compact implementation. In order to perform complex switching operations, also multiple ones of such parking valves, which can be switched by the control device, may be provided, of which parking valves each one may have a number of sample reception volumes.

According to an embodiment example, the successive emptying of the sample sections out of the sample reception volumes may be effected such that a feed line, which can be brought in fluid communication with the sample reception volumes, is flushed by a flushing fluid, in order to clean the feed lines by flushing the feed lines prior to the subsequent emptying. Alternatively or in addition to the adjusting of the filling and/or emptying order, it is also possible to avoid a direct bringing-in-contact of sample sections, which are not directly adjacent to one another in the sample source, by cleaning, by flushing with a flushing fluid, feed lines and/or fluid lines, which are possibly still occupied with residues of historical fluidic samples, prior to the transitioning of a next sample section, which is currently temporarily stored in a sample reception volume, for the fluidic further processing. Demonstratively, packages of flushing fluid may be arranged between sample sections, which have been emptied successively, in order to avoid their interaction with one another. Also in this way, a sample carry-over may be effectively suppressed.

According to an embodiment example, the feed line can be flushed with a fluid, which is free of the fluidic sample to be detected, of a sample section, which is located in a sample reception volume, as the flushing fluid. According to this preferred implementation, no separate flushing fluid (in the sense of a mobile phase which is provided extraneously especially for the flushing) needs to be provided, but use can be made of the knowledge (which can for example be obtained from a detector signal) of the composition of the fluid sections at the outlet of the sample source, in order to identify sections of a fluid in a sample section that has just been temporarily stored, which [sections of fluid] do not contain a fluidic sample, but for example only solvent. Such sections of a sample section may be used for flushing the feed lines, without fearing a sample carry-over therefrom. If, for example, a detector, which scans the successive sample sections in respects of the presence of detection signals of a fluidic sample, is provided in the area of the outlet of the sample source, then sample-free sections of a sample section can be detected and can be marked down for the subsequent use as a flushing fluid. Mismeasurements due to a sample carry-over may thus be suppressed virtually without additional technical (apparatus-supported) effort.

According to an embodiment example, the feed line may be flushed with the flushing fluid temporaly between the filling and the emptying. By flushing the feed lines at the interface between filling and emptying, which [interface] is particularly critical with regard to sample carry-over, there remains a high degree of freedom of design with regard to the selection of a filling and/or emptying order. For example, in this case, a filling and/or emptying may also be performed according to a FIFO principle ("first in, first out"), according to which the sample section, which was filled in a sample reception volume firstly, is at first emptied and supplied to the further processing, then the sample section, which has been temporarily stored as the second one, etc. The sample section, which has been filled into a sample reception volume as the penultimate one, is emptied as the penultimate one, and the sample section, which has been filled into a sample reception volume as the last one, is emptied at the very end. The realization of such a FIFO principle has the advantage, that thereby a reordering of sections of a mass spectrum can be dispensed with, which is preferred when realizing a LIFO principle by the adaptation of the order of said emptying.

According to an embodiment example, a fluidic sample may be separated in the sample sections in the sample source. Due to this separation of the fluidic sample in the sample sections, adjacent sample sections at the outlet of the sample source will then have a closer relationship to one another than sample sections, which are spatially more distant from one another. Then, the avoidance of an interaction of sample sections, which are initially not directly adjacent to one another downstream of the sample source in the context of the temporarily storing in the sample reception volumes, results in the sample sections, which do not have a close relation from the separation, not getting into effective connection with one another. Mismeasurements resulting therefrom may then be eliminated.

According to an embodiment example, in the method, a sample section, which has just been emptied, may further be separated, particularly chromatographically separated, more particularly separated by liquid chromatography, in its components. Thus, a first sample separation may be effected in the sample source, and a second sample separation (and/or a further separation) may be performed downstream of the temporarily storing, and thus, in summary, a two-dimensional sample separation method may be performed. Particularly, in this way, a two-dimensional separation by liquid chromatography is enabled, without mismeasurements resulting from the adaptation of the second dimension to the first dimension. Such an adaptation between the first dimension and the second dimension may become necessary, for example, because the second dimension may be able only to process another (particularly smaller) flow-rate than the first dimension. The adaption of the flow-rates may then be effected by the temporarily storing of the sample sections in the sample reception volumes.

According to an embodiment example, in the method, a sample section, which has just been emptied, may further be injected into a fluidic path between a fluid conveying device for conveying a mobile phase as well as the sample sections and a sample separation device for separating the sample sections in components. After said temporarily storing, a respective sample section may thus be transferred into a (particularly further) analytical path, by conveying this sample section in (or as) the mobile phase and by separating it for example under a high pressure by a particularly chromatographical sample separation device.

According to an embodiment example, the successive emptying of the sample sections out of the sample reception volumes can be effected such that, while emptying, it is actively avoided, to bring two respective ones of the sample sections, which have not left the sample source directly adjacent to one another, in contact with one another. In contrast to a purely passive, forcedly coupled readout (for example, in a fixed interconnection, in which one sample section after the other is simply filled in at first and then emptied), according to the described embodiment in example, a bringing-in-contact of sample sections, which are not directly successive to one another at the outlet of the sample source, can be avoided actively, particularly actively-adaptively.

According to an embodiment example, two respective ones of the sample sections, which have left the sample source directly adjacent to one another, may adjoin to one another directly physically without a medium provided therebetween (particularly without a fluid section that separates these sample sections) at a fluidic outlet of the sample source. On the contrary, two respective ones of the sample sections, which have left the sample source directly adjacent to one another, may have a medium (particularly, a fluid section that separates these sample sections, for example in the form of another one of the sample sections) between one another at a fluidic outlet of the sample source.

According to an embodiment example, a first separation of a fluidic sample (in fractions) may be performed in the sample source, and a second separation (in partial fractions) may be performed after the emptying of the sample sections of the fluidic sample. In such a two-dimensional sample separation, each fraction and/or partial fraction of the fluidic sample, and thus each peak in a corresponding measurement spectrum (particularly a chromatogram), may be characterized by a retention time (or a retention volume) in the first dimension and by a retention time (or a retention volume) in the second dimension.

According to an embodiment example, the controlling of the further processing of the sample sections may comprise a controlling of the separating of the sample sections in fractions. The assignment information, which is assigned to the individual sample sections and reflects their processing history, may thus be used to correctly perform the separation of the particular sample sections in fractions, and in particular to interpret the result of the separation correctly. Due to a re-ordering of the sample sections after the temporarily storing in contrast to the conditions prior to the temporarily storing, an according adaptation of the separation may become necessary, which adaptation may be related to the respective sample section. In particular, a separation in the sample source (that is, a separation of a first stage) may be synchronized with respect to a separation in a further processing path downstream of the sample reception volumes (that is, a separation of a second stage).

According to an embodiment example, the controlling of the separation may comprise an adjusting of a gradient of a composition of a mobile phase, which is conveyed with a fluidic sample of a respective sample section adsorbed thereon by a sample separation device, on the basis of said assignment information. In a chromatographical separation, components of a fluidic sample are firstly adsorbed at a chromatography separation column as the sample separation device. In a so-called gradient mode, the fractions of the fluidic sample are then detached (relieved) due to a change of the composition of the solvent by the sample separation device. If, in order to avoid undesired sample carry-over and resulting chromatographic mismeasurements due to the occurrence of artificial peaks, a reordering of the sample section is performed in relation with the temporarily storing and the forwarding of the sample sections, then the requirement to adapt the gradient with regard to the re-ordered sample sections and/or to rearrange it section-wise possibly also comes along therewith.

According to an embodiment example, the controlling of the separation may comprise a re-ordering of an order (or sequence) of the detection signals assigned to the individual sample sections based on the assignment information. Thus, if the sample sections are re-ordered in relation with the temporarily storing in the sample reception volumes in order to exclude a direct bringing-in-contact of sample sections, which have initially not been directly adjacent to one another, then, demonstratively, also sections in the detection signals (in particular, a chromatogram) are re-ordered, which results first of all in an artificial measurement spectrum. By a back-ordering of the measurement spectrum in the sense that sections of the measurement spectrum, which correspond to the re-ordered sample sections are rearranged in a corresponding way, a measurement result free of rearrangement artefacts can be obtained thereby. The rearrangement can be performed unambiguously on the basis of the assignment information.

According to an embodiment example, the assignment information may be indicative for a rank of the respective sample section in a ranking order (filling order) of a filling, which precedes the emptying, of the sample reception volumes with the sample sections in relation to a rank of the respective sample section in the order of the emptying (emptying order) of the sample sections out of the sample reception volumes (which in particular is different to a filling order). In order to avoid, in the further processing of the sample sections, artefacts, which result from a different order or ranking order of the sample sections upon emptying in contrast to the filling (for example, if the framework conditions, such as a solvent composition, vary temporally during the further processing), the data set of the assignment information assigned to a respective sample section may, for example, correlate the emptying rank with the filling rank. Then, there exists a virtually total freedom of the choice and/or the setting of a desired emptying order in relation to the filling order, because an unambiguous (filling and emptying) history of a specific sample section always remains reconstructable and/or traceable by the assignment information even for a complex re-ordering of the sample sections. This makes the fluid processing robust against errors and at the same time insusceptible to sample carry-over.

According to an embodiment example, the sample source may be embodied as a first separation stage for separating the fluidic sample in the sample sections, wherein at least one of the sample sections has at least one fraction of the fluidic sample. The fluid processing device may be embodied as a second separation stage for separating at least one of the fractions of the sample sections in partial fractions. Both separation stages may be chromatographic separation stages. Thus, the system may be embodied as a sample separation apparatus.

The sample separation apparatus may be a micro fluidic measurement device, a liquid chromatography device and/or a HPLC and/or UHPLC system. However, other applications are possible.

The sample separation device may comprise, in each separation stage, a pump for moving the respective mobile phase. Such a pump may for example be configured to convey the mobile phase through the system with a high pressure, for example some 100 bar up to 1000 bar.

Alternatively or in addition, the sample separation device may have a sample fractioning device for fractioning the separated components. Such a fractioning device may direct the different components for example in different liquid containers. However, the analyzed fluid sample may also be discarded.

Preferably, the sample separation device may have, in one or each of the separation stages, a detector for detecting the separated components. Such a detector may generate a signal, which can be observed and/or recorded, and which is indicative for the presence and the amount of the sample components in the fluid that flows through the system.

BRIEF DESCRIPTION OF THE DRAWINGS

Other objects and many of the accompanying advantages of embodiment examples of the present invention will become easily appreciable and better understandable with reference to the following detailed description of embodiment examples in relation to the appended drawings. Features, which are substantially or functionally the same or similar, are provided with the same reference numerals.

FIG. 5 shows a chromatogram of a first chromatography separation stage and a chromatogram of a second chromatography separation stage of a two-dimensional liquid chromatography device, in which [chromatogram] artefacts can be recognized, which [artefacts] result at least also (in part) from a temporarily storing of sample sections between the first separation stage and the second separation stage.

FIG. 6 shows another chromatogram of a first chromatography separation stage and another chromatogram of a second chromatography separation stage of a two-dimensional liquid chromatography device, in which [chromatogram] artefacts can be recognized, which [artefacts] result at least also (in part) from a temporarily storing sample sections between the first separation stage and the second separation stage.

FIG. 7A shows schematically an order of the filling of sample reception volumes with sample sections and a subsequent emptying of the temporarily stored sample sections out of the sample reception volumes, wherein the emptying is performed in the same order as the filling, by what the risk of generating artefacts is threatening at the transition between filling and emptying.

FIG. 7B and FIG. 7C show schematically a respective order of the filling of sample reception volumes with sample sections, and a subsequent emptying of the temporarily stored sample sections out of the sample reception volumes, according to exemplary embodiment examples of the invention, wherein the emptying is performed in a reverse order as compared to the filling with formation of a respective step-free transition between the filling and the emptying, by what qualitative artefacts are avoided.

FIG. 8 shows a chromatogram of a first chromatography separation stage and a chromatogram of a second chromatography separation stage of a two-dimensional liquid chromatography system according to an exemplary embodiment example of the invention, wherein artefacts are avoided, which result from a temporarily storing of sample sections between the first separation stage and the second separation stage.

Figure 1:
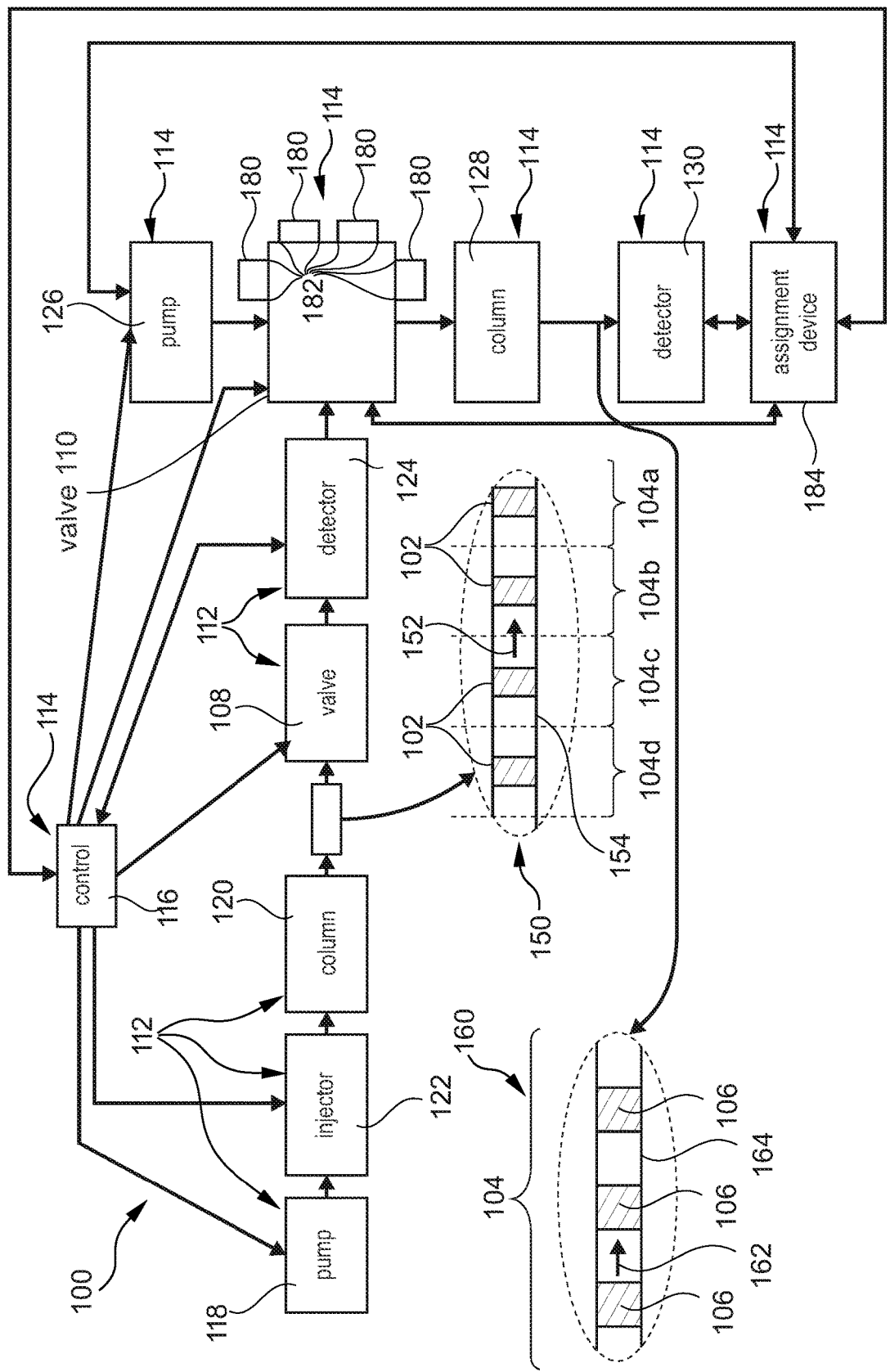
FIG. 1 shows a two-dimensional liquid chromatography system according to an exemplary embodiment example of the invention, having a sample source as the first separation stage and, as the second separation stage, a fluid processing device for processing successive fluidic sample sections provided by the sample source.

The representation in the drawings is schematic.

Before the Figures shall be described in detail, some general considerations from the present inventors in respect of exemplary embodiment examples of the invention are presented.

According to an exemplary embodiment example, there is established a control sequence for emptying (demonstratively, also referred to as parking out and/or picking out) of sample sections, which control sequence is advantageous and/or optimized in respect of the suppression of sample carry-over, wherein the sample sections are parked and/or temporarily stored in sample reception volumes (for example sample loops). In particular, a non-FIFO (i.e. performed in deviation from a "first in, first out" scheme) emptying order may be realized in order to suppress artefacts when peak-parking in a two-dimensional liquid chromatography (2D-LC) system.

Modern 2D-LC systems may be provided with a decoupled scheme for filling-in of sample section, which have fractions of a fluidic sample, in sample reception volumes (particularly sample loops of parking valves) and for an analysis of the real and/or current contents of a sample reception volume (particularly a loop content) in a second separation dimension. A loop selector belonging thereto may also be referred to as a parkade (parking structure) and may be formed as a fluid valve, thus a parking valve. Exemplary embodiment examples of the invention enable to avoid an undesired sample carry-over when providing one or a plurality of such parkades.

FIG. 1 shows a system 100, which is for processing a fluidic (for example liquid) sample and is embodied as a sample separation device, according to an exemplary embodiment example of the invention.

The system 100 comprises a fluid processing device 114 and a sample source 112 operatively coupled therewith. The fluid processing device 114 serves to further process, stated more precisely further separate, successive fluidic sample sections 104 provided by the sample source 112. The sample sections 104 are generated by the sample source 112 by separating the fluidic sample. The system 100 is thus embodied as a two-dimensional (2D) high-performance-liquid-chromatography (HPLC) system.

The sample source 112 serves to separate the fluidic sample in fractions 102 (according to associated peak zones in a chromatogram), of which in each case one is present in an associated one of the plural successive sample sections 104 in the illustration shown. Though, the limits (or frontiers) of the sample sections 104 do not need to coincide compulsorily with the limits of the fractions 102; rather, it may occur that a fraction 102 is split in two at a limit between sample sections 104 and is thus present in corresponding portions in two or more sample sections 104. In a first detail 150 in FIG. 1, it is shown, how particular serial sample sections 104 (which, for simplification of the distinction, are also referenced as 104a, 104b, 104c, 104d) flow in the interior of a fluid path 154 along a flow direction 152 in a first separation stage, in the form of the sample source 112. The separation of the fluidic sample in the fractions 102 thus occurs in the sample source 112 as the first separation stage.

The system 100 further serves to separate each one of the fractions 102 (and/or each one of the sample sections 104) in multiple particular partial fractions 106. This is effected in the fluid processing device 114 and is shown in a second detail 160 in FIG. 1, which illustrates the particular serial partial fractions 106 in the interior of a fluid path 164 along a flow direction 162 in a second separation stage, which is established by the fluid processing device 114. The separation of the fractions 102 in the partial fractions 106 is thus effected in the second separation stage by the fluid processing device 114.

The first separation stage has a first processing capacity for amounts of samples (sample amount processing capacity), that is an intrinsic characteristics in regard of a sample that can be processed in one separation cycle and/or in one separation time period. The second separation stage has a second sample amount processing capacity, that is an intrinsic characteristics in regards of a sample that can be processed in one separation cycle and/or in one separation time period. The first separation stage as the sample source 112 delivers a fluid flow, which contains the fractions 102 adjacent to, and/or between, sample-free solvent zones. The second separation stage in the form of the fluid processing device 114 has to cope with the demands of the first separation stage, without the separation process being disturbed thereby.

According to FIG. 1, a fluidic switching arrangement is formed by a blocking valve 108 as a fluid valve and by a modulator valve 110 as another fluid valve. By a corresponding controlling of the blocking valve 108 and/or of the modulator valve 110 it is possible either to couple the first separation stage, that is the sample source 112, with the second separation stage, that is the fluid processing device 114 (that is to enable a transferring (conveying) of sample sections 104 from the first separation stage into the second separation stage), or alternatively, to decouple fluidically the first separation stage from the second separation stage (that is to make impossible a fluid flow and thus a transitioning of sample sections 104 from the first separation stage to the second separation stage). A corresponding control is effected by a control device 116, which controls the cooperation of the particular components of the system 100 according to FIG. 1, and particularly also of the blocking valve 108 and the modulator valve 110. It is possible to combine the functions of both the valves 108, 110 in a common valve.

The sample source 112 contains a first liquid pump 118, which pumps a mobile phase in the form of a temporarily varying solvent composition to an injector 122. At the injector 122, the fluidic sample to be separated is introduced into the mobile phase. Subsequently, the mixture of the mobile phase and the fluidic phase is directed through a first chromatographic separation column in the form of a sample separation device 120, where the fluidic sample is separated in the particular fractions 102. The first fluid pump 118 and the injector 122 are controlled by the central control device 116. A first detector 124 enables the detection of the individual fractions 102.

The second separation stage in the form of the fluid processing device 114 contains a second liquid pump or fluid conveying device 126, which pumps a further mobile phase (that is, another temporarily constant or varying solvent composition) and transports the liquid sections coming from the first separation stage to a second separation column and/or sample separation device 128. In the example shown, at the second chromatography separation column respectively sample separation device 128 of the second separation stage as the fluid processing device 114 a respective fraction 102 of a respective sample section 104 is chromatographically separated in the respective partial fractions 106. The partial fractions 106 can be detected in a second detector 130 (for example, a UV, fluorescence or other detector). FIG. 1 shows furthermore that the central control device 116 also controls the second liquid pump or fluid conveying device 126.

According to the described exemplary embodiment example, the control of the two-dimensional liquid chromatography separation is effected by the control device 116 as follows:

Initially, a chromatographic separation of the fluidic sample in the fractions 102 is effected and/or at least started in the first separation stage/sample source 112. By the fluidic switch arrangement 108, 110 being open and/or being opened, a sample section 104a, which is at the front in the flow direction and which contains precisely one fraction 102 in the example shown can be transferred from the first separation stage to the second separation stage, that is the fluid processing device 114. Thereafter, the subsequent sample section 104b can be transferred to the second separation stage, etc. This procedure can be repeated arbitrarily often, such that the pre-separated sample sections 104 can be introduced into the second separation stage by-and-by. Demonstratively, due to the described control logic sample sections 104 (and thus corresponding peaks in a chromatogram) can be parked at an interface between the first separation stage or sample source 112 and the second separation stage or fluid processing device 114, stated more precisely, in and/or at the modulator valve 110, while at least one other sample section 104 is still being processed (particularly separated) in the second separation stage, i.e. the fluid processing device 114. A gradient mode can also be applied in the second separation stage, which gradient mode can, however, be controlled independently from the gradient mode of the first separation stage.

The fluid processing device 114 has a plurality of sample reception (or holding) volumes 180, for temporarily storing the sample sections 104 prior to their further processing, in the form of capillary parts between respective ports 182 of the modulator valve 110, which are configured to subsequently temporarily fill with a respective one of the sample sections 104 according to a control (activation) of the modulator valve 110 by the control device 116. Each one of the sample reception volumes 110 is thus established as a fluid line section between two respective ports 182 of the modulator valve 110. The control device 116 is also configured for successively emptying of the sample sections 104 out of the sample reception volumes 180, such that, while emptying, it is avoided to bring two respective ones of the sample sections 104, which have not left the sample source 112 directly adjacent to one another, in contact with one another. For example, the sample sections 104b and 104c, which have been directly adjacent to one another in the sample source 112, may not be emptied directly one after the other. On the contrary, an emptying, that is performed directly one after the other, of the sample sections 104a and 104d, which have not been directly adjacent to one another in the sample source 112, but have been spaced apart by the sample sections 104b and 104c, can be disabled by the control logic. Thereby, a direct contact between sample sections 104, which are strongly different in regard of the separation in the first dimension, due to sample residues in feed lines of the modulator valve 110, etc., and thus, an impurification of a sample section 104 with false (erroneous) artificial additional peaks, can be avoided. A filling and emptying order may be adapted accordingly, which may also comprise a reordering of the processing order of the sample sections after the filling and prior to the emptying.

The control device 116 is furthermore configured to control a further processing of the sample sections 104 based on an assignment information. To this end, an assignment device 184 is provided as a part of the fluid processing device 114, wherein the assignment device is configured to assign assignment information to at least one of the emptied sample sections 104. The assignment information is indicative for an order of the filling and of the emptying of each (or a respective) one of the sample sections 104, and is able to assign a corresponding emptying rank of a sample section 104 (that is, a position of the sample section 104 in an emptying ranking order of the sample sections 104) to a corresponding filling rank of this sample section 104 (that is, a position of the sample section 104 in a filling ranking order of the sample sections 104). This enables, at each point in time, the unambiguous determination, which history a fluid, which is currently in the fluid processing device 114, has gone through, even with a re-ordering of the sample sections 104 between the filling and the emptying. Thus, the separation process in the second dimension (particularly a gradient run) can be adapted (or matched) to a respective presently flowing fluid.

The control device 116, which may be coupled, such that it is able to communicate, with the assignment device 184 can be configured to control a further processing of the sample sections 104 based on the assignment information. This control of the further processing of the sample sections 104, which is based on the assignment information, may comprise a controlling of a chromatographic separation of the fractions 102 of the sample sections 104 in the partial fractions 106. The controlling of the separation may comprise an adjusting of a gradient of a composition of a mobile phase, which adjustment is performed separately on the basis of the assignment information individually for each particular sample section 104, wherein the mobile phase is conveyed, with, adsorbed thereon, a fluidic probe of a respective sample section 104, by the sample separation device 128. The controlling of the separation may also comprise a re-ordering of an order of detection signals assigned to the particular sample sections 104 based on the assignment information. If the chronology of the separation is disturbed by an order of the emptying, which deviates from an order of the filling, this may, due to the different waiting times of the sample sections 104 in the sample reception volumes 180, result in the retention times, which can be taken directly from the chromatogram, being provided with offsets that are specific for a sample section. These [offsets] can be corrected calculationally by the assignment information, which reflects the history of each sample section 104, in order to obtain a chromatogram that is independent of the processing history.

The successive emptying of the sample sections 104 out of the sample reception volumes 180 is effected by the control device 116 such that it is avoided that components of a sample section 104, which is not adjacent to a just emptied sample section 104 prior to the filling, remain in feed lines and impurify the just emptied sample section 104. An order of the filling of the sample reception volumes 180 with the sample sections 104 and an order of the emptying of the sample sections 104 out of the sample reception volumes 180 can be adapted (matched) to one another by the control device 116, such that upon the transition between the filling and the emptying, the lastly filled sample reception volume 180 is emptied at first. The emptying of the sample sections 104 out of the sample reception volumes 180 can be effected by the control device 116 in a reverse order as compared to an order of the filling of the sample reception volumes 180 with the sample sections 104 ("last in, first out"). The filling and the emptying of the sample reception volumes 180 can be performed by switching of the modulator valve 110, which is embodied as a fluid valve, where the switching is by the control device 116.

Alternatively or in addition to a re-ordering of the sample sections 104 between the filling and the emptying, the successive emptying of the sample sections 104 out of the sample reception volumes 180 can also be effected, by the control device 116, in a controlled way for avoiding qualitative artefacts, such that a feed line, which can be brought in fluid communication with the sample reception volumes 180, is, for cleaning the same, flushed with a flushing fluid (that is a sample-free mobile phase). Thereby, the feed line can be flushed with a fluid, which is free of the fluidic sample to be detected, of a sample section 104 located in a sample reception volume 180 as the flushing fluid. Detail 150 shows that, due to the detection of the fractions 102 in the first detector 124, it is known or it can be determined, in which sections of a respective sample section 104 a fraction 102 of the fluidic sample is present, and in which sections the sample-free mobile phase is present. The latter sample-free sections of a respective sample section 104 can be used to flush feed lines prior to the emptying of a sample section 104. A respective feed line can be flushed with the flushing fluid, between the filling and the emptying, by the control device 116. This has the advantage, that a contamination of a sample section 104 with a fluidic sample of another sample section 104 is avoidable without additional technical (apparatus-based) effort and without limitation in regard of a filling and emptying order.

Figure 2:
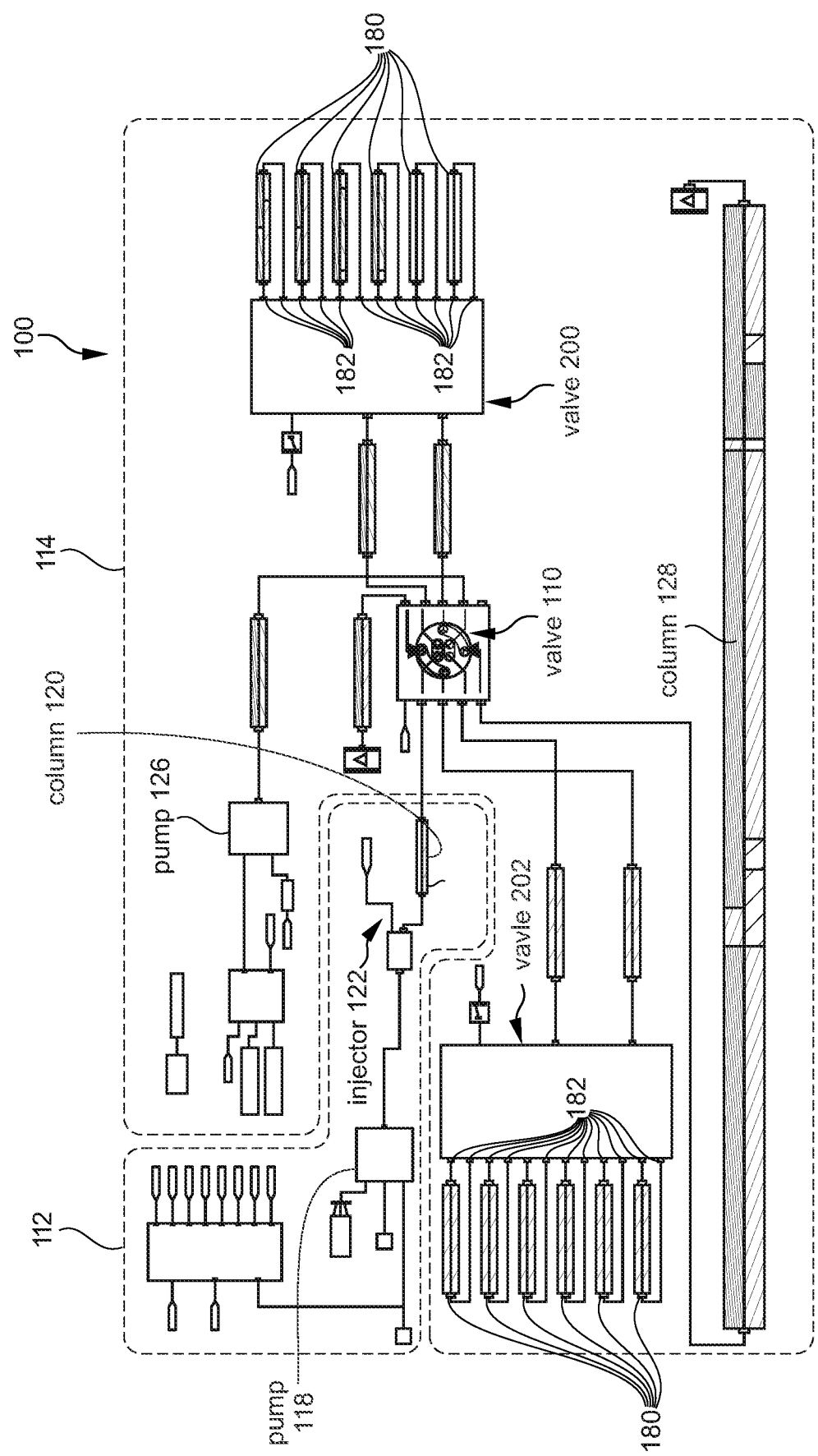
FIG. 2 shows a two-dimensional liquid chromatography system having another fluid processing device for processing successive fluidic sample sections provided by a sample source, according to an exemplary embodiment example of the invention.

FIG. 2 shows a system 100, which is embodied as a two-dimensional liquid chromatography system and which has another liquid processing device 114 for processing successive fluidic sample sections 104 provided by a sample source 112, according to an exemplary embodiment example of the invention.

FIG. 2 shows the modulator valve 110 as well as additionally two parking valves 200, 202 in fluid communication with the modulator valve 110. Each one of the parking valves 200, 202 is configured to temporarily store a plurality of sample sections 104 (see FIG. 1). To this end, a plurality (six in the example shown) of sample reception volumes 180 are associated to the temporary storage valves or parking valves 200, 202. FIG. 2 shows that, apart from the sample reception volumes 180, various feed lines and drain lines (with respectively associated capillary volumes) are provided, along which the fluid sections move, in order to be subjected firstly to a first separation in the sample source 112 and to be subjected subsequently to a further separation in the second separation stage, which is embodied by the fluid processing device 114. Because fluid residues of a preceding sample section 104 can still be present in the feed lines and the drain lines, according to an embodiment example of the invention, a processing order of the sample sections 104 by the feed lines and/or the drain lines can be controlled in such a way, that a mixing of samples, which leads to artefacts, can be prevented.

Figure 3:
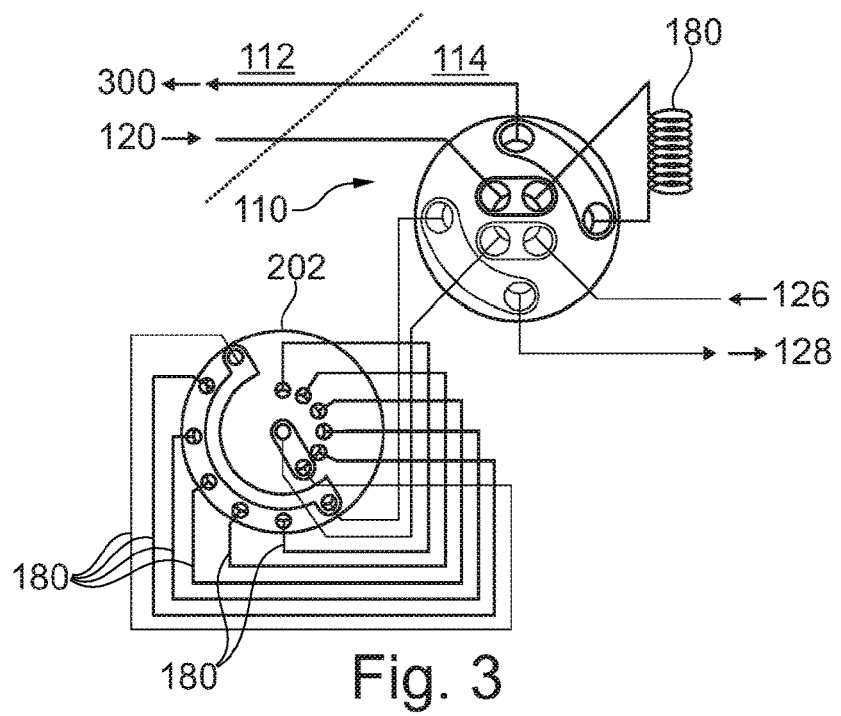
FIG. 3 shows a modulator valve, a sample loop associated therewith as sample reception volumes, and a parking valve in fluid communication with a plurality of sample reception volumes associated therewith, for temporarily storing sample sections between a sample source and a fluidic further processing device, according to an exemplary embodiment example of the invention.

FIG. 3 shows a modulator valve 110, a sample loop as the sample reception volume 180 as well as a parking valve 202 in fluid communication with the modulator valve 110, and a plurality of further sample reception volumes 180 for temporarily storing sample sections 104 between a sample source 112 and a fluidic further processing device as the fluid processing device 114, according to an exemplary embodiment example of the invention. FIG. 3 shows a 12-port column selection valve as the parking valve 202, to which a plurality of sampling and/or parking loops are assigned as further sample reception volumes 180. It is further shown in FIG. 3, that a port of the modulator valve 110 is fluidically coupled with a waste terminal 300.

Concerning the sample source 112, ports to the sample separation device 120 as well as to the waste terminal 300 are shown. According to the shown valve position of the modulator valve 110, pre-separated fluidic sample (that is, a sample section 104) from the sample separation device 120 is currently conveyed through the modulator valve 110 into the sample reception volume 180.

At the same time, the fluid conveying device 126 conveys a mobile phase through the modulator valve 110, and thereby pumps, in the shown valve position, a sample section, which is currently located in one of the sample reception volumes 180 of the parking valve 202, through the modulator valve 110 to the sample separation device 128.

By a respective switching of the fluid valves 110, 202, sample sections 104 can thus be filled in respective sample reception volumes 180, or can be emptied out of the sample reception volumes 180 for the further processing in the analytical separation path of the second separation stage.

Figure 4:
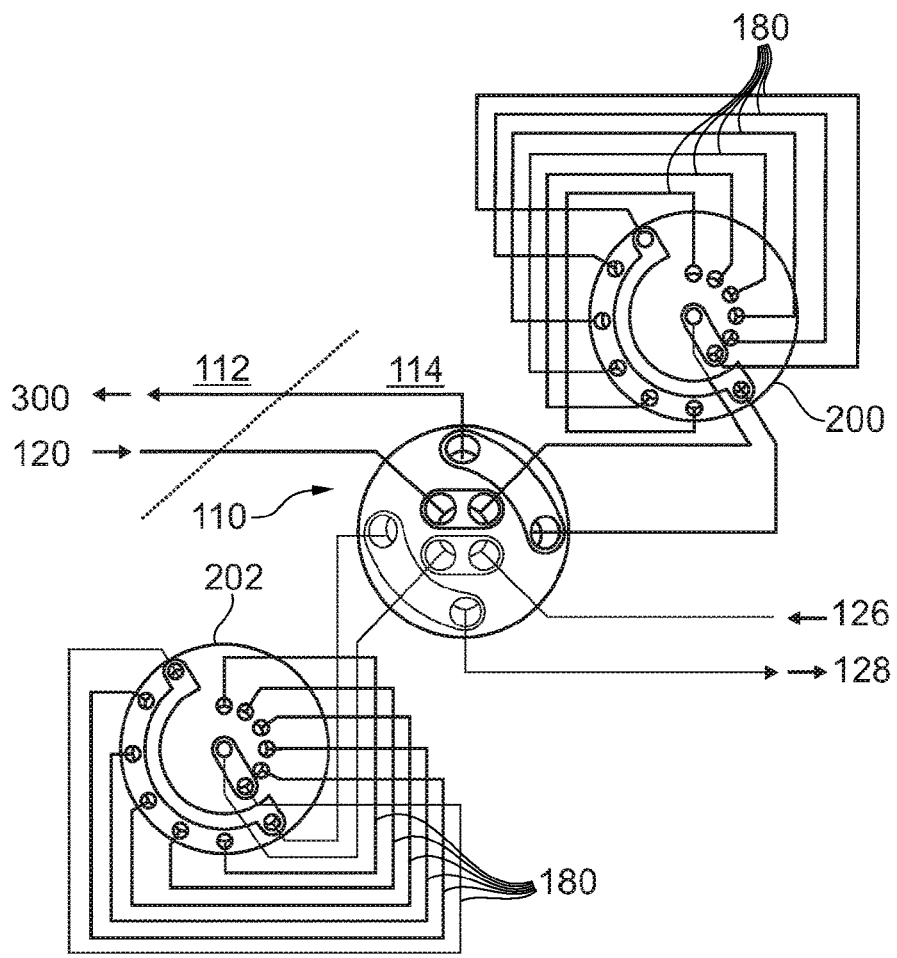
FIG. 4 shows a modulator valve, a parking valve in fluid communication with a plurality of sample reception volumes associated therewith, and a further parking valve in fluid communication with a further plurality of sample reception volumes associated therewith, for temporarily storing sample sections between a sample source and a fluid processing device for fluidic further processing, according to an exemplary embodiment example of the invention.

FIG. 4 shows a modulator valve 110, a parking valve 200 in fluid communication with a plurality of sample reception volumes 180 as well as a further parking valve 202 in fluid communication with a further plurality of sample reception volumes 180 for temporarily storing sample sections 104 between a sample source 120 and a fluidic further processing device as the fluid processing device 114, according to another exemplary embodiment example of the invention. FIG. 4 shows a tandem configuration comprising two parkages (parking structures). The fractions of the first dimension, which are eluted from the sample separation device 120, can be received successively in the particular (individual) sample reception volumes 180 of the parking valve 200, while the analytical pump or fluid conveying device 126 of the second dimension reads out and/or empties out sample sections 104 from the further sample reception volumes 180, which [sample sections] are parked in the other parking valve 202 (respectively, the parkage).

For example, if an arrangement of two parking valves 200, 202 is provided (see for example FIG. 4), a switching of a modulator valve 110, which effects the coupling between the first separation dimension and the second separation dimension, can be effected after the readout respectively parking-out of the sample sections 104 out of the sample reception volumes 180 by one of the two associated parking valves 200, 202. A current sample reception volume 180, which belongs to one of the parking valves 200, 202, can be connected with a fluid path, which corresponds to an analytical separation path of the second dimension. No matter, which liquid (fluidic sample and/or mobile phase/matrix) is in the feed lines (that is, in the connections to the parking valve and the last parking loop as a sample reception volume 180, which is filled with the effluence (outflow) of the first dimension), this liquid may comprise some eluent fraction. An immediate switching of the respective parking valve to another parking loop as the sample reception volume 180 would bring the contents of the transfer capillaries in operative connection with an earlier fraction, and therefore possibly cause artefacts. This can lead to false results, because the user would reason that the artefact also belongs to the fraction to be analyzed. The occurrence of such artefacts is shown in FIG. 5.

FIG. 5 shows a chromatogram 500 of a first chromatography separation stage and a chromatogram 506 of a second chromatography separation stage of a two-dimensional liquid chromatography apparatus, wherein artefacts can be recognized, which result from a temporarily storing of sample sections 104 between the first separation stage and the second separation stage. The retention time is plotted along an abscissa 502. A detection signal is plotted along an ordinate 504.

According to FIG. 5, and as shown with the reference numeral 510, the results in the second separation dimension of a peak having the reference #1 are correct. However, as shown with the reference numeral 520, the results in the second separation dimension of a peak having the reference #2 are not correct. Furthermore, as shown with the reference numeral 530, the results in the second separation dimension of the peak having the reference #3 are correct.

A cause for false results can be taken from FIG. 5. This cause is a switching of the valve arrangement 110, 200, 202 for the continuative analysis of a peak #2 of the first dimension, when peak #3 is just about to be eluted through the transfer lines, which connect the parking valve 200 or, as the case may be, 202 with the modulator valve 110 and in which also the peak #2 is present at this point in time. The result (see reference numeral 520) in the second separation dimension is therefore a mixture between the peak #2 of the first dimension and artefacts of peak #3. FIG. 5 therefore illustrates the cause of false results in the second separation dimension.

Therefore, a corresponding analysis run should be performed with the sample reception volume 180 and/or with the loop, which was in operation in the first dimension at last, and/or a cleaning procedure can be performed, before the analysis of the fractions, which have been introduced before, can start. Therefore, the contents of the transfer lines (and possibly the loop, which was in operation in the first dimension at last) can pass the sample separation device 130 of the second dimension, in order to perform such a cleaning.

However, if a return to the first position (or to any other position, which passes the sample reception volumes 180 respectively loops with undefined contents or with probes that are already parked) is effected, all of the skipped loops are connected at least temporarily with the analytical pump or fluid conveying device 126 of the second dimension. Therefore, a mixing of fluid is effected in the outlet transfer line. This is shown in FIG. 6.

FIG. 6 shows another chromatogram 600 of a first chromatography separation stage and another chromatogram 606 of a second chromatography separation stage of a two-dimensional liquid chromatography system, wherein artefacts can be recognized, which result from a temporarily storing of sample sections 104 between the first separation stage and the second separation stage.

According to FIG. 6, as shown with the reference numeral 610, the results in the second separation dimension of the peak with the reference #1 are correct. Furthermore, reference numeral 620 shows an expected feature according to a cleaning run with the contents of the peak having the reference #3 in the first separation dimension. Furthermore, as shown with the reference numeral 630, the results in the second separation dimension of the peak having the reference #2 are correct. Furthermore, reference numeral 640 shows, as expected, a result according to a cleaning run without contents. However, as shown with the reference numeral 650, the results in the second separation dimension of the peak having the reference #3 are not correct, and namely for example due to the process as described above.

Thus, also FIG. 6 shows a source of false two-dimensional separation results. These can be referred to as lateral flow during the conveying-back.

In order to avoid such problems, according to an exemplary embodiment example of the invention, a reverse emptying of the sample sections 104 filled in the sample reception volumes 180, or an emptying of the sample sections 104 filled in the sample reception volumes 180 in a reverse direction, can be effected. In this context, it can be advantageous to re-sort (re-order) the measurement data according to the reverse (in comparison to the filling) emptying order, in order to obtain a correct representation (that is, according to the elusion order in the first dimension) of the sample along the time axis of the detection signal of the second dimension. The order of the emptying of the sample reception volumes 180 can thus be effected such that each crosstalk (leakage) between the sample reception volumes 180 and/or the sample sections 104 contained therein is avoided. This ensures a correct interpretability of the results. An according solution according to an exemplary embodiment example of the invention consists in analyzing the peak fractions in the fluid processing device 114 in a reversed order (with respect to the outlet of the sample source 112), such that the individual fractions are free from crosstalk (leakage). This produces correct results.

FIG. 7A shows schematically an order of the filling (see reference numeral 700) of sample reception volumes 180 with sample sections 104 and a subsequent emptying (see reference numeral 710) of the temporarily stored sample sections 104, wherein the emptying is performed in the same order as the filling. Thus, the risk of artefacts is threatening. The filling and/or emptying order according to FIG. 7A accomplishes a filling in the forward direction (that is, a filling of the sample reception volumes 180 in the order of the sample sections 104 #1, #2, #3, #4, #5, #6) and an emptying respectively a read-out in a corresponding order as with the filling (that is, an emptying of the sample reception volumes 180 in the order of the sample sections 104 #1, #2, #3, #4, #5, #6). A switching of the valve arrangement 110, 200, 202 is effected at an interface 720 between the filling and the emptying.

FIG. 7B and FIG. 7C each show schematically an order of the filling of sample reception volumes 180 with sample sections 104 and a subsequent emptying of temporarily stored sample sections 104 according to an exemplary embodiment example of the invention, wherein the emptying is performed in a reverse order as compared to the filling, whereby at least qualitative artefacts (that is, the occurrence of false (erroneous) peaks in a chromatogram) are avoided.

The filling and/or emptying sequence according to FIG. 7B accomplishes a filling in the forward direction (that is, a filling of the sample reception volumes 180 in the order of the sample sections 104 #1, #2, #3, #4, #5, #6) and an emptying and/or a read-out in a reverse order as compared to the filling (that is, an emptying of the sample reception volumes 180 in the order of the sample sections 104 #6, #5, #4, #3, #2, #1). Thus, FIG. 7B corresponds to a "last in, first out" scheme. To this end, there is effected a sequential switching of the modulator valve 110 at first and then of the respective parking valve 200, 202 (backward movement).

The filling and/or emptying order according to FIG. 7C accomplishes a filling in the forward direction (that is, a filling of the sample reception volumes 180 in the sequence of the sample sections 104 #1, #2, #3, #4) and an emptying and/or a read-out in a reverse order as compared to the filling (that is, an emptying of the sample reception volumes 180 in the order of the sample sections 104 #4, #3, #2, #1). According to FIG. 7C, only four slots are filled in the forward direction and then emptied and/or read-out in the reverse order. FIG. 7C corresponds to a peak-controlled switching with usage of only a portion of the parkage, followed by a backward movement.

Stated demonstratively, a back-conveying can be performed, in which the sample reception volumes 180 (for example sample loops) are analyzed in reverse order. According to exemplary embodiment examples, it is not only possible to support completely filled parking valves 200, 202 (that is, to fill and to empty all the corresponding sample reception volumes 180), but it is also possible to adapt the workflow such that the sample reception volumes 180 of a parking valve 200, 202 are filled only partially and the sample separation device 130 in the second dimension is kept busy.

FIG. 8 shows a chromatogram 800 of a first chromatography separation stage and a chromatogram 806 of a second chromatography separation stage of a two-dimensional liquid chromatography apparatus as the system 100 according to an exemplary embodiment example of the invention, wherein artefacts are avoided, which result from a temporarily storing of sample sections 104 between the first separation stage and the second separation stage.

According to FIG. 8, as shown with the reference numeral 810, the results in the second separation dimension of the peaks having the reference #1 are correct. Furthermore, reference numeral 820 shows an expected features according to a cleaning run with the contents of the peak having the reference #3 in the first separation dimension. Furthermore, as shown with the reference numeral 830, the results in the second separation dimension of the peak having the reference #2 are correct. Now, as shown with the reference numeral 840, also the results in the second separation dimension of the peak having the reference #3 are correct.

As can be recognized on the basis of FIG. 8, correct results can be obtained with the switching order (sequence) for filling and emptying according to an exemplary embodiment example of the invention. Neither influences from sample carry-over nor a fluidic crosstalk (leakage) leads to artefacts in the measurement spectrum. FIG. 8 thus shows a two-dimensional analysis using a cleaning and a reverse parking-out. It can be taken from FIG. 8, that all the results are correct. However, the peak #3 from the first separation dimension is, now analyzed significantly later in the run, which results from the emptying in reverse order. This effect can be compensated calculatorally using assignment information.

Dependent on the interest in the contents of the last sample reception volume 180, the cleaning gradient can be a complete analysis in the second dimension or a shortened version, which focuses on a transport of the contents of the sample volume 180 and of the contents of the line down to the second sample separation device 130.

Due to the complete traceability of the sample fractions and their analysis in the second separation dimension, it is possible (in an error-robust as well as simple way), to re-order the particular data blocks in the second dimension according to the elusion order of the fractions in the first dimension. In particular, it is possible to perform a back-calculation of the gradient (drift mode) of the second dimension to the values at the point in time of the parking and/or the filling-in.

Figure 9:
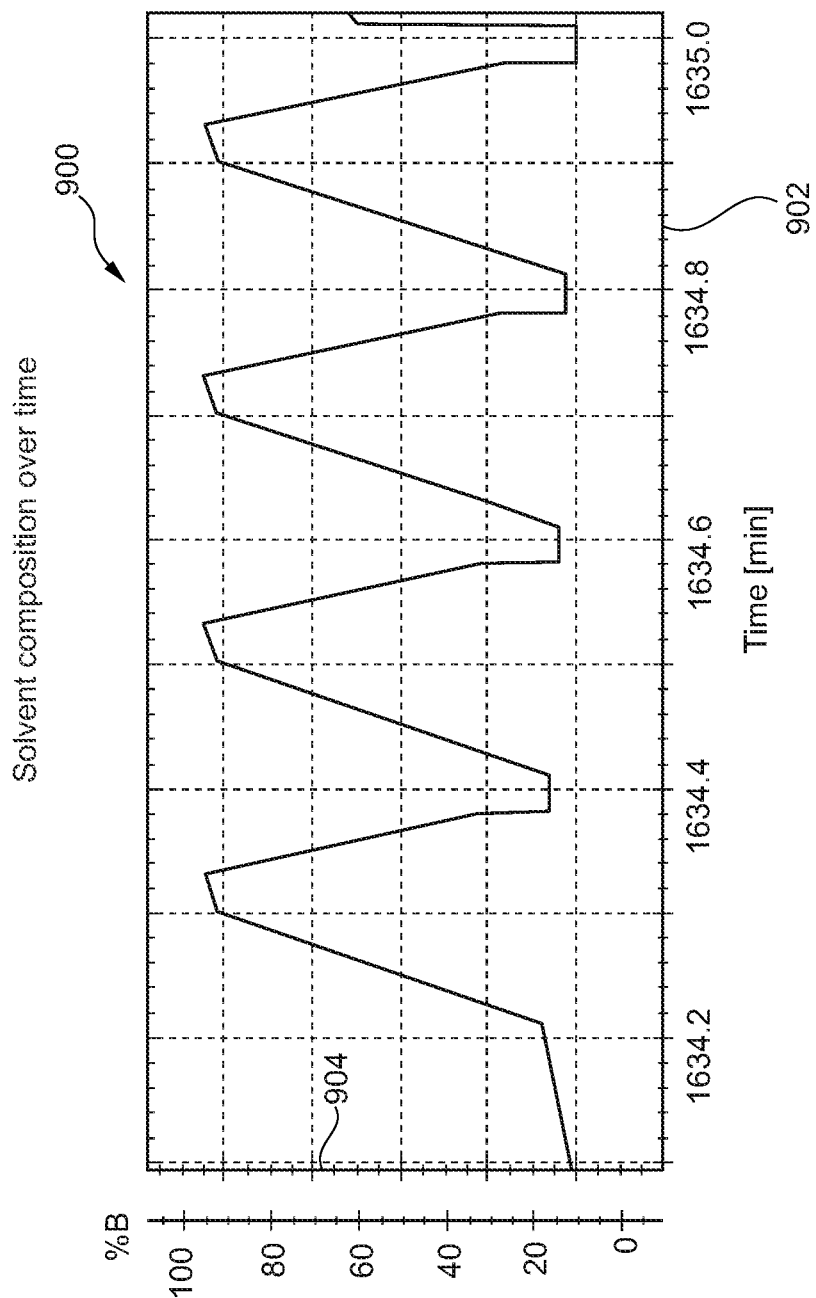
FIG. 9 shows the solvent composition over time of a gradient run of a two-dimensional liquid chromatography system, according to an exemplary embodiment example of the invention.

FIG. 9 shows a variation in time of the solvent composition of a two-dimensional liquid chromatography apparatus, according to an exemplary embodiment example of the invention. Stated more precisely, FIG. 9 shows a diagram 900 having an abscissa 902, along which the measurement time is plotted, and having an ordinate 904, along which is plotted the temporal composition of a mobile phase for a gradient run in the context of a chromatographic separation experiment (stated more precisely, the portion of a solvent B of the composition). An adaptation of the gradient can be based on the assignment information in such a way, that upon a respective emptying of a sample section 104 out of a sample reception volume 180, the sample section 104 is acted upon with such a solvent composition, which prevailed and/or was programmed prior to the temporarily filling-in for this sample section 104.

By a combination of some or all of the above-described features of exemplary embodiment examples of the invention, it is possible to perform a processing of only a portion of the available or installed sample reception volumes in a parking valve in a second separation dimension, before a switching-back to the first separation dimension is effected. The same applies to the case of cascaded parking valves.

According to exemplary embodiment example of the invention, the fluidic ports downstream of the "highest" (in the sense of the flow path) switching point, which directs the fluid from the first (filling) to the second (emptying) dimension, are not changed, after the flow at this switching point has been switched, and at least until the fluid in the switchable portion of the flow path downstream of the switching point has been replaced completely (cleaning). According to another exemplary embodiment example, it is possible to effect the described change of the flow path only between irrelevant segments of the flow path (for example, such segments, which do not contain fractions to be analyzed, for example, which are empty).

According to an exemplary embodiment example, it is possible that the switching of one or a plurality of parking valves with connected second dimension is effected only in a such way, that no path segments having parked samples are skipped. This means, that as soon as a flow path segment (sample loop, parking valve of a higher level in a cascade, etc.), which contains a collected fraction, is connected to the flow path of the second dimension, it is analyzed in the second dimension instead of being skipped.

According to an exemplary embodiment example of the invention, the order of the reading-out of the fractions out of a parking valve or out of a plurality of parking valves can be defined by the described conditions, in particular can be performed in the backward direction.

According to an exemplary embodiment example, a difference between the parking order and the real (or true) data during the read-out of the fractions can be corrected by re-ordering the data blocks generated in the second dimension. Such a re-ordering can be performed during runtime or in an offline mode, in particular based on an unambiguous tracing of the fractions.

Even in the case of a drifting gradient, the true analysis gradient can be corrected after the conversion of the gradient of the second dimension, matched to the values of the composition, which were active while a sample section had actually been parked.

In the case that a cleaning cycle yielded usable data, which represent an eluate of the first dimension, quantitative results can be corrected (for example, scaled, rule of proportion, etc.); thereby, the net volume of the size of a sample range (sample reception volume plus feed lines) can be anticipated.

It should be noted, that the term "comprising" (or "having") does not exclude other elements, and that the term "a" (or "an") does not exclude a plurality. Also, elements, which have been described in connection with different embodiment examples, can be combined. It should also be noted that reference numerals in the claims shall not be construed as limiting the scope of the claims.

The invention claimed is:

1. A method for processing successive fluidic sample sections provided by a sample source configured to chromatographically separate a fluidic sample into sample fractions, the method comprising:
    receiving the sample sections from the sample source, wherein one or more of the sample sections contain, respectively, one or more sample fractions separated in the sample source and detectable as peaks by a detector;
    successively temporarily filling in a controlled filling sequence more than two sample reception volumes with at least a respective one of the sample sections, wherein the sample reception volumes are defined by a plurality of respective, separate fluid line sections; and
    successively emptying the sample sections out of the sample reception volumes in a controlled emptying sequence by selecting an order of the emptying of the sample sections out of the sample reception volumes in a reverse order to the controlled filling sequence such that the lastly filled sample reception volumes are emptied at first and provided for further separation of the one or more sample fractions;
    wherein the successively temporarily filling comprises operating a fluidic switch to selectively couple the fluid line sections with the sample source according to the controlled filling sequence, and the successively emptying comprises operating the fluidic switch to selectively couple the fluid line sections with a downstream flow path according to the controlled emptying sequence.

2. The method according to claim 1, wherein the successively emptying of the sample sections out of the sample reception volumes is effected such that it is avoided for components of a sample section, which is, prior to the filling, not adjacent to a sample section that has just been emptied, to remain in feed lines and to impurify, to contaminate or to lead to a sample carry-over to the sample section that has just been emptied.

3. The method according to claim 1, wherein the filling and the emptying of the sample reception volumes is controlled by switching at least one fluid valve.

4. The method according to claim 3, wherein at least one of the fluid line sections is between two respective ports of the at least one fluid valve.

5. The method according to claim 1, wherein the successively emptying the sample sections out of the sample reception volumes is effected such that, while emptying, a direct bringing-in-contact of different sample sections is made impossible.

6. The method according to claim 1, wherein in the sample source, the fluidic sample is separated in the sample sections.

7. The method according to claim 1, comprising a feature selected from the group consisting of:
    the method further comprises, after the emptying, successively conveying the sample sections into a fluidic path between a fluid conveying device for conveying a mobile phase and a fluid separation device for further separating the sample sections into the one or more sample fractions;
    the successively emptying of the sample sections out of the sample reception volumes is effected such that, while emptying, it is actively avoided to bring two respective ones of the sample sections, which have not left the sample source directly adjacent to one another, in contact with one another;
    two respective ones of the sample sections, which have left the sample source directly adjacent to one another, adjoin directly physically, without a medium arranged therebetween, with one another at a fluidic outlet of the sample source; and
    a combination of two or more of the foregoing.

8. The method according to claim 1, further comprising:
    assigning assignment information to at least one of the sample sections, wherein the assignment information is indicative for a rank of the respective sample section in at least one of a ranking order of the filling of the sample reception volumes with the sample sections or a ranking order of the emptying of the sample sections out of the sample reception volumes; and
    controlling a further processing of the sample sections on the basis of the assignment information.

9. A fluid processing apparatus for processing successive fluidic sample sections provided by a sample source configured to chromatographically separate a fluidic sample into sample fractions, the fluid processing apparatus comprising:
    more than two sample reception volumes, which are configured to be filled successively temporarily with at least a respective one of the sample sections in a controlled filling sequence, wherein one or more of the sample sections contain, respectively, one or more sample fractions separated in the sample source and detectable as peaks by a detector, and the sample reception volumes are defined by a plurality of respective, separate fluid line sections;
a control device configured to successively empty the sample sections out of the sample reception volumes in a controlled emptying sequence by selecting an order of the emptying of the sample sections out of the sample reception volumes in a reverse order to the controlled filling sequence such that the lastly filled sample reception volumes are emptied at first and provided for further separation of the one or more sample fractions; and
a fluidic switch, wherein the control device is configured to successively temporarily fill the sample reception volumes with the sample sections by controlling the fluidic switch to selectively couple the fluid line sections with the sample source according to the controlled filling sequence, and the control device is configured to successively empty the sample sections out of the sample reception volumes by controlling the fluidic switch to selectively couple the fluid line sections with a downstream flow path according to the controlled emptying sequence.

10. The fluid processing apparatus of claim 9, comprising:
an assignment device configured to assign assignment information to at least one of the sample sections, wherein the assignment information is indicative for a rank of the respective sample section in at least one of a ranking order of the filling of the sample reception volumes with the sample sections or a ranking order of the emptying of the sample sections out of the sample reception volumes;
wherein the control device is configured to control a further processing of the sample sections on the basis of the assignment information.

11. A system for processing a fluidic sample, the system comprising:
the fluid processing apparatus of claim 9; and
the sample source.

12. The system according to claim 11, wherein:
the sample source is configured as a first separation stage for separating the fluidic sample into the sample sections, wherein at least one of the sample sections has at least one fraction of the fluidic sample; and
the fluid processing apparatus is configured as a second separation stage for separating at least one of the fractions of the sample sections into partial fractions.

13. The fluid processing apparatus of claim 9, wherein the fluidic switch comprises a fluidic valve comprising a plurality of ports, and the fluid line sections comprise respective sample loops coupled between respective pairs of ports of the plurality of ports.

14. A method for processing successive fluidic sample sections provided by a sample source configured to chromatographically separate a fluidic sample into sample fractions, the method comprising:
receiving the sample sections from the sample source, wherein one or more of the sample sections contain, respectively, one or more sample fractions separated in the sample source and detectable as peaks by a detector;
successively temporarily filling in a controlled filling sequence of more than two sample reception volumes with at least a respective one of the sample sections, wherein the sample reception volumes are defined by a plurality of respective, separate fluid line sections;
successively emptying of the sample sections out of the sample reception volumes in a controlled emptying sequence by selecting an order of the emptying of the sample sections out of the sample reception volumes in a reverse order to the controlled filling sequence such that the lastly filled sample reception volumes are emptied at first and provided for further separation of the one or more sample fractions;
assigning assignment information to at least one of the sample sections, wherein the assignment information is indicative for a rank of the respective sample section in at least one of a ranking order of the filling of the sample reception volumes with the sample sections or a ranking order of the emptying of the sample sections out of the sample reception volumes; and
controlling a further processing of the sample sections on the basis of the assignment information;
wherein the successively temporarily filling comprises operating a fluidic switch to selectively couple the fluid line sections with the sample source according to the controlled filling sequence, and the successively emptying comprises operating the fluidic switch to selectively couple the fluid line sections with a downstream flow path according to the controlled emptying sequence.

15. The method according to claim 14, wherein the controlling of the further processing of the sample sections comprises a controlling of the further separation of the one or more fractions.

16. The method according to claim 15, comprising a feature selected from the group consisting of:
the controlling of the further separation comprises an adjusting, based on the assignment information, of a gradient of a composition of a mobile phase, which is conveyed with a respective sample section after the emptying;
the controlling of the separation comprises a re-ordering, based on the assignment information, of an order of detection signals assigned to the particular sample sections; and
both of the foregoing.

17. The method according to claim 14, wherein the assignment information is indicative for a rank of the respective sample section in the ranking order of said filling of the sample reception volumes with the sample sections in relation to a rank of the respective sample section in a different ranking order of said subsequent emptying of the sample sections out of the sample reception volumes.

* * * * *